United States Patent [19]
Sendyk et al.

[11] 3,993,877
[45] Nov. 23, 1976

[54] AUTOMATIC DIALING EQUIPMENT

[75] Inventors: Andrzej M. Sendyk; Dennis W. Johnson, both of Saskatoon, Canada

[73] Assignee: Sed Systems Ltd., Saskatoon, Canada

[22] Filed: June 16, 1975

[21] Appl. No.: 587,138

[30] Foreign Application Priority Data
June 21, 1974 Canada .............................. 203023

[52] U.S. Cl. ............................................. 179/90 B
[51] Int. Cl.² ......................................... H04M 1/45
[58] Field of Search .......... 179/90 B, 90 BB, 90 BD, 179/18 BA, 18 D, 18 DA, 37–40

[56] References Cited
UNITED STATES PATENTS

| | | | |
|---|---|---|---|
| 3,194,890 | 7/1965 | Haskins .......................... | 179/18 BA |
| 3,334,190 | 8/1967 | Jenkins et al. .................. | 179/18 BA |
| 3,493,688 | 2/1970 | Schoefler ....................... | 179/18 BA |
| 3,573,389 | 4/1971 | Greenstein et al. ............ | 179/18 BA |
| 3,600,522 | 8/1971 | Benson ........................... | 179/18 BA |
| 3,882,284 | 5/1975 | Munday .......................... | 179/90 B |
| 3,917,911 | 11/1975 | Lesher ............................ | 179/37 |

*Primary Examiner*—Kathleen H. Claffy
*Assistant Examiner*—Gerald L. Brigance
*Attorney, Agent, or Firm*—Laff, Whitesel & Rockman

[57] ABSTRACT

An automatic dialer which receives address digits dialed from a telephone set and outdials a destination number. A programmable Send Only M.O.S. Memory stores a plurality of destination numbers at address locations. The dialer can be connected to a telephone line at the central office, at the subscriber's location, or anywhere on the line, to a PBX trunk, either at the PBX or the control office. The dialer can be made transparent to dialed digits upon receipt of a predetermined digit.

14 Claims, 8 Drawing Figures

AUTOMATIC DIALING EQUIPMENT

This invention relates to a telephone dialer which automatically sends a series of digits to designate a called number over telephone line upon receipt of a reduced number of digits or a single digit from a station set.

Devices for automatically outpulsing a called number on a telephone line have been known for some time in the telephone industry. For instance, a subscriber has been able to automatically outpulse a prestored number pushing a selected button on the device, or after having turned a roll or drum on which a number has been recorded. Some telephone central offices have also given subscribers the ability to dial abbreviated codes, whereupon a program control in the switching office causes a previously stored number to be outpulsed.

However, the aforenoted structures have for the most part not provided a satisfactory solution to a problem which has become evident: the unavailability of a universal unit, which can be connected either to PBX trunks or to subscribers lines anywhere in the loop, i.e., either at the central office, at a PBX, or at a subscriber's station set itself; a unit which is useful for both audio and pulse transmission applications, yet has protection from user tampering and manipulation of digits for unauthorized purposes.

An automatic telephone dialer according to the present invention has broad application, since it can be used both for computer terminal access of specific lines or trunks, as well as for subscriber telephone access; it has a memory which is programmable and thus can have its stored destination numbers changed; it can be located anywhere in the loop or attached to a trunk, thereby giving dialing access to either a single subscriber station or one of a number and is locatable for physical access either at the station set, at a centralized terminal location, or at the central office; yet it has protection against unauthorized changing of the destination number digit series. It can also be made effectively transparent to numbers dialed to a central switching office, under control of the telephone company.

The automatic dialer comprises sensing means for sensing a dialed address digit which may appear on a telephone line (for instance, a single digit dialed by a subscriber) or the like. A first translating means is connected to the sensing means for translating the address digit into an address location signal, which represents one of a number of address locations in a memory. A memory is connected to the first translating means, for storing a group of predetermined destination numbers, at predetermined address locations therein. Second translating means is connected to the memory for receiving from the memory a predetermined number stored at the address location which corresponds to the address digit, the second translating means converting the predetermined number to a serially coded destination number. Means is connected to the second translating means for generating a destination number digit series, and transmitting it over the telephone line to a central office.

It may be seen therefore, that a single address digit appearing on the line causes a destination number digit series to be generated, made up of as many digits as needed, which series is transmitted on the telephone line.

The memory in this invention is preferably an MOS Programmable Read-Only Memory which stores, for instance, 2,048 bits. If arranged in 32 rows of 16 byte locations, each made up of four binary digits per byte, 32 sixteen digit numbers can be stored in the memory, since any number from 0 to 9 can be stored in a 4 bit location. The last byte location, or the byte location immediately following the last digit of the destination number series, is reserved for an "end of sequence indication" leaving capacity for a 15 digit number. This indication can either by an empty byte location, or a special "end of sequence" digit to by sensed by the dialer decoding logic. Preferably, the "end of sequence" digit is stored as a 0, which the dialed digit 0 is stored as a 10, or a sequence of 10 pulses, as is normal in telephone signalling.

The invention will be better understood by consideration of the following description, in conjunction with the drawings, in which:

FIG. 3 shows how FIGS. 4, 5, 6 and 7 should be arranged together,

FIGS. 4, 5, 6, 7 and 8 together is a detailed schematic of the invention.

Figure 1:
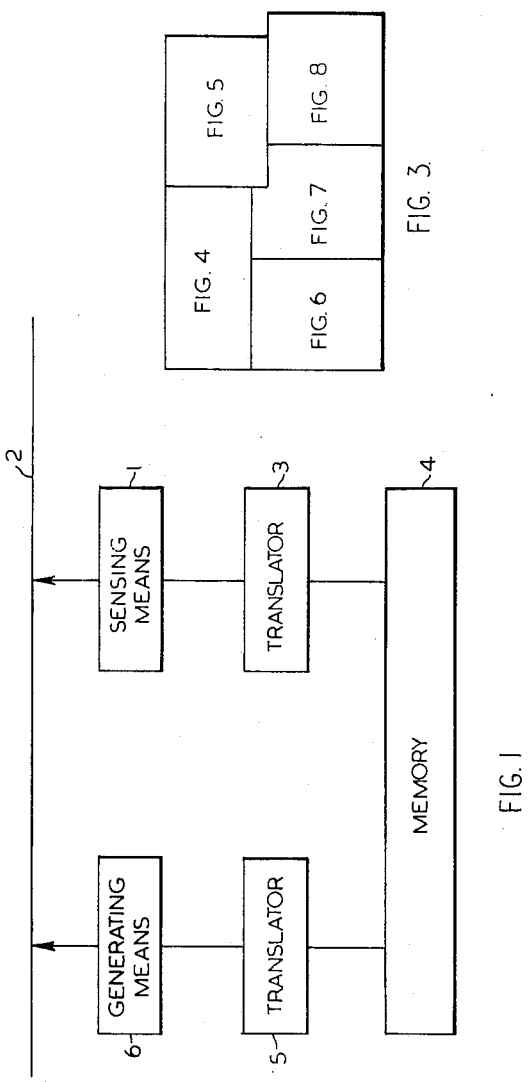
FIG. 1 is a basic block schematic of the invention in its broadest aspects.

Referring now to FIG. 1, the basic invention is shown in block schematic form. A sensing means 1 is adapted to sense an address digit which may appear on a telephone line 2. The telephone line may be a PBX trunk or a subscriber's line leading directly to a central office.

The sensing means senses the initiation of a digit which may appear on the line, and passes the current change indication to a first translating means 3.

The first translating means translates the address digit into an address location signal, which represents one of a number of address locations in the memory of the automatic dialer where destination numbers are stored.

A memory means 4 is connected to the first translating means 3. It is preferred that the memory means is a MOS Programable Read Only Memory, which can be accessed by the application of an address signal in parallel binary form, and in response thereto, will read out in similar form the content of the memory stored at the address location.

A second translating means 5 is connected to the output of the memory means 4 and receives therefrom the predetermined destination number stored at the address location. The translating means 5 converts the binary coded predetermined destination number to a serially coded destination number.

Generating means 6 which is connected to the second translating means generates a destination numbered digit series and transmits it over the telephone line 2.

To be discussed later are provisions made to protect the central office from receipt of the address digit from the station set, as well as to insure that the corresponding line relay in the switching office is maintained operated once activated, ignoring the status of the station set, except under control of the automatic dialer. Provision is also made to recycle the automatic dialer to a start position in the event the station set goes on hook during outpulsing of the destination number digit series by the automatic dialer.

The address digit which may appear on the line can be either tone or pulse in nature. However, this disclosure will describe the invention specifically as relating to the pulse form of digit, presently being the preferred embodiment. Also, while the signal generated could be one of tonal nature, in the present disclosure a dial pulse form of signal will be used by way of description.

Figure 2:
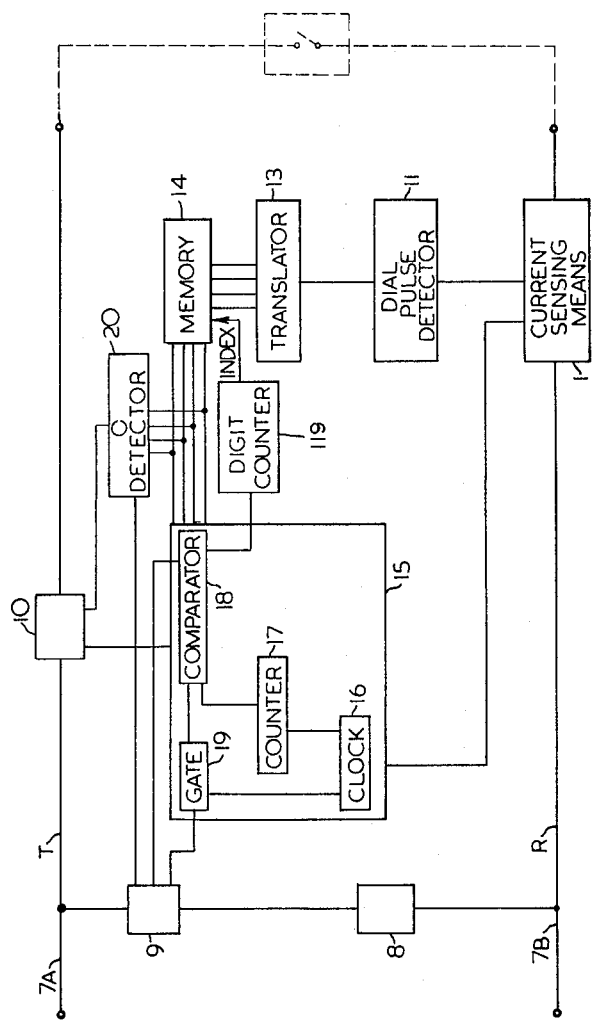
FIG. 2 is a more detailed block schematic of the invention.
Figure 4:
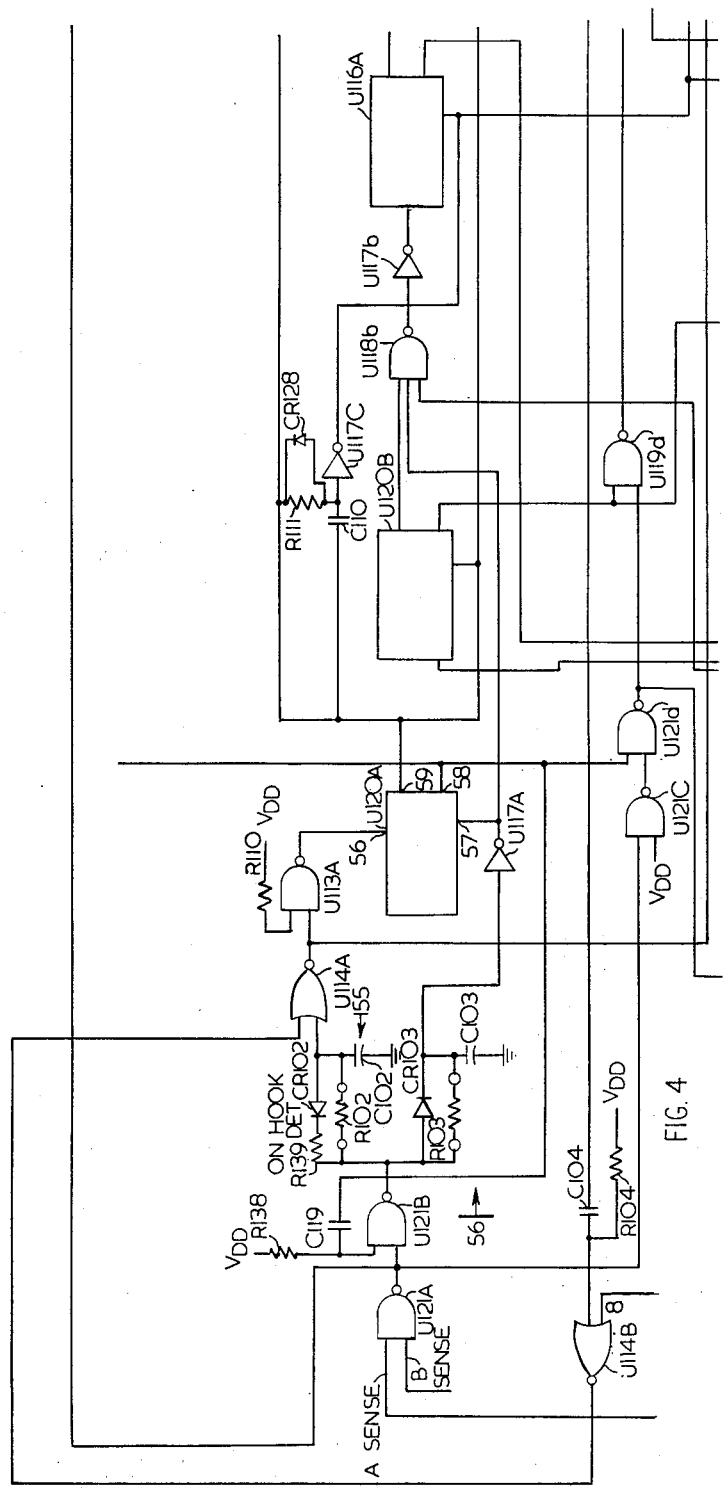
Figure 5:
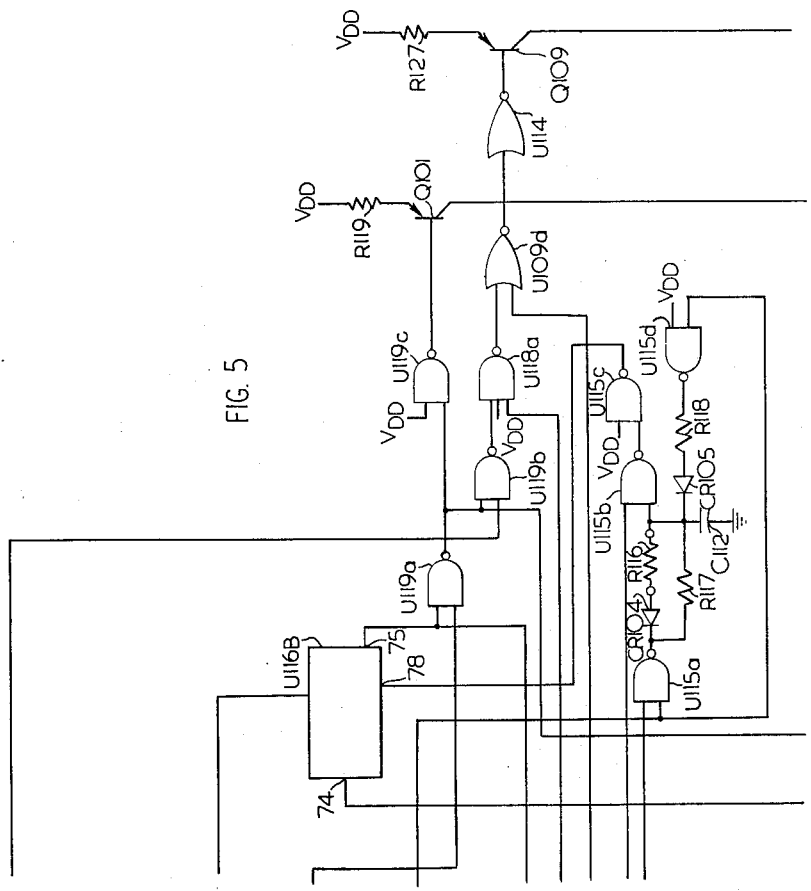
Figure 6:
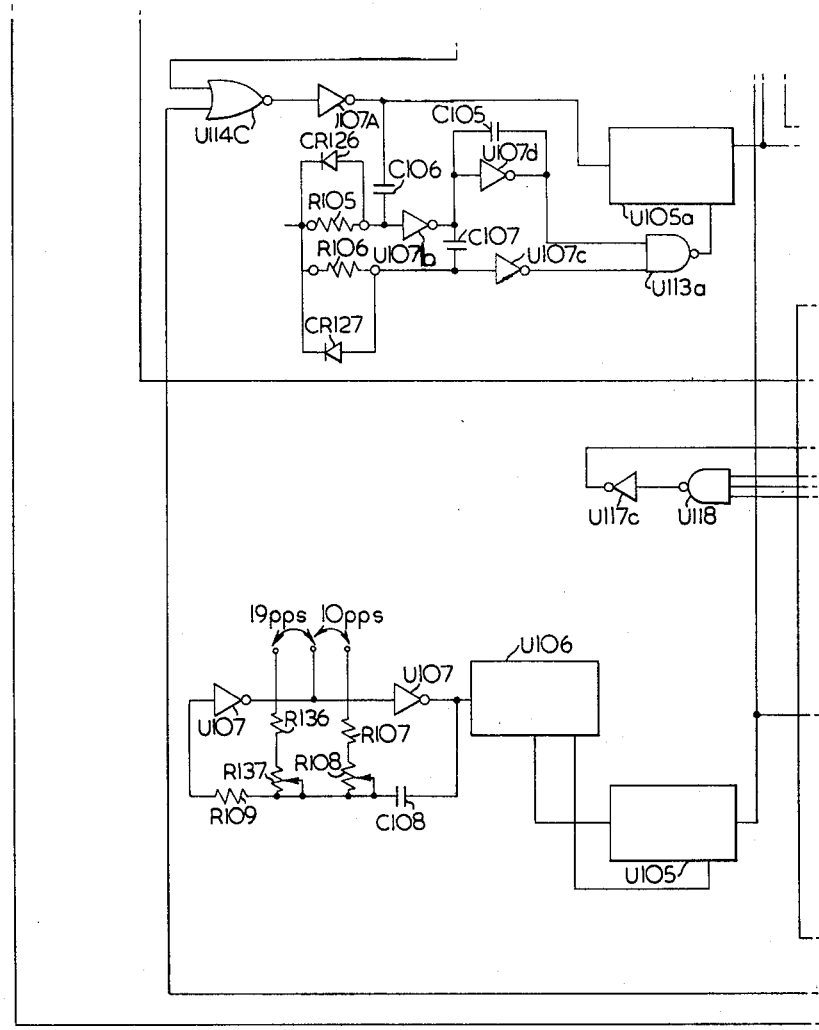
Figure 7:
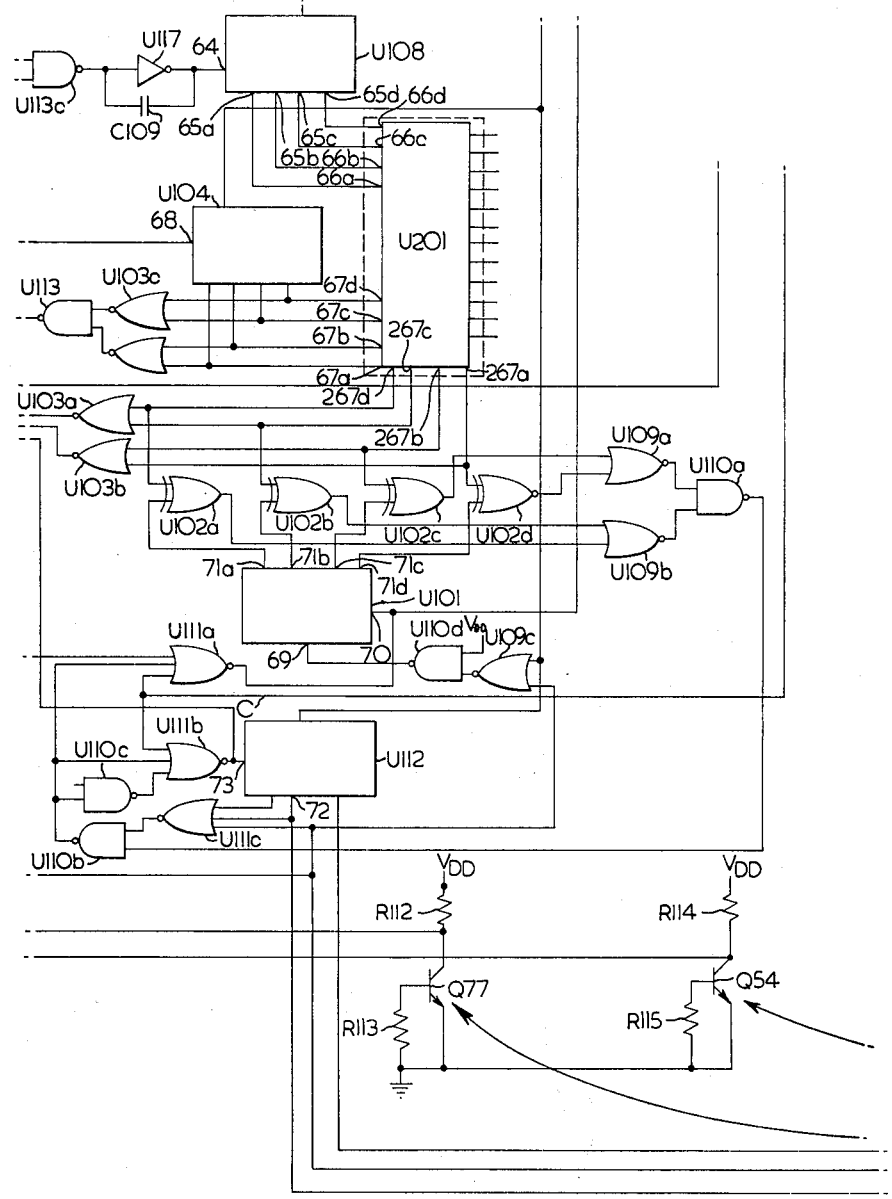
Figure 8:
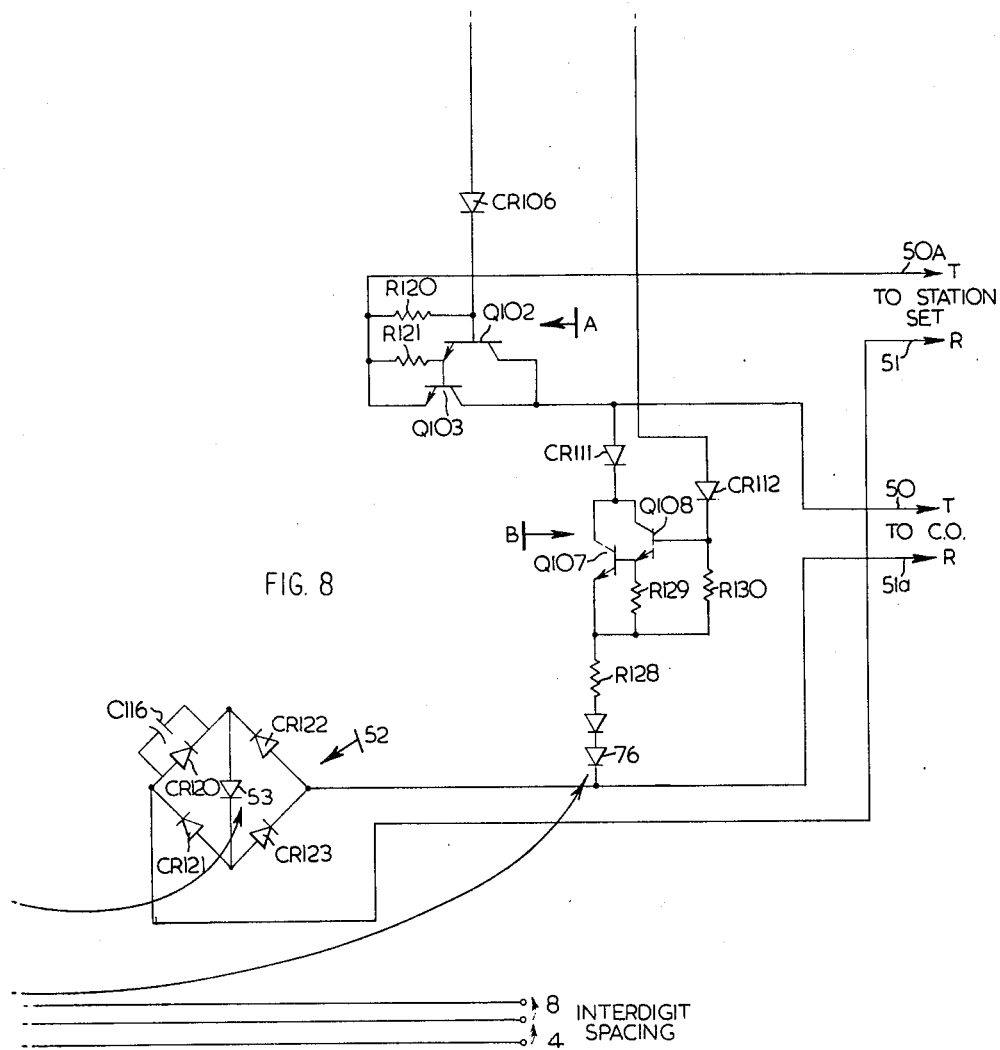

The automatic dialer will now be described in more detail, with reference to the more detailed block diagram in FIG. 2. Here is shown a subscriber's line comprising leads 7a and 7b, which respectively can be the tip and ring leads of a subscriber's loop. During the period of reception of an address digit from the line and during outpulsing by the dialer, a dummy load 8 is connected between the leads 7a and 7b. Preferably, the load 8 is connected in series with a normally open switch 9 which can be a well known switched transistor or Darlington pair circuit. The load 8 can be a 150 ohm resistor, to simulate the impedance seen by the subscriber's loop in the station set.

A normally closed switch 10 is provided in series with one of the wires shown here in the tip lead, which is closed during reception of the address digit, but cuts off all but residual current flow along the line to the station set during generation of the destination number digit series by the telephone dialer. Normally closed switch 10 also preferably is a switched transistor or a Darlington pair of transistors.

The current sensing means 1 is connected in series with one of the leads 7b, i.e. the ring lead of the telephone line, and is very fast responding and sensitive. Usefully, the current sensing means is comprised of a light emitting diode, in an optical isolator. Current flowing in the transistor portion of the optical isolator therefore will be an indication of current flow in the ring lead 7b. The current sensing means therefore will sense the existence or absence of current, and the existence of a dial pulse, which is characterized by a break in current flow down the line.

Connected to the current sensing means 1 is a dial pulse detector 11, which measures the period of any break in the current flow. A break with a particular predetermined time tolerance is considered as a dial pulse, which is then transferred to a first digit translating means 13, which comprises a pulse counter. The count of the number of dial pulses received determines the address digit on the subscriber's line.

A first digit translation means 13 thus counts up the number of dial pulses in the address digit, and converts the counted number into an address location signal for MOS memory 14. Within the logic of the first translation means is a serial to binary code converter, which provides the proper parallel binary code for accessing an address location in the memory.

As noted earlier, the memory preferably is an MOS PROM, for instance the Intel Corporation of California semiconductor memory code number 1702A.

With the address location in memory 14 of the predetermined destination number identified, accessing it through the address signal will allow the destination number to be read out of memory 14 into second digit translating means 15. The BCD binary coded number in the first byte location of the memory address location will be read out to the second digit translation means 15. Clock 16 passes its pulses to a counter, which automatically counts up until it matches the number read out from the memory 14, as well as to gate 19, which operates switch 9. Comparator 18 compares the counted digits with the numbers stored from memory 14, and inhibits gate 19 when the number stored matches the counted digits. Accordingly, the current path through dummy load 8 which is connected across the leads 7a–7b, will be pulsed the proper number of times, which applies the first digit of the stored number to the subscriber's line. Switch 10 is opened during the pulsing period by translating means 15.

A digit counter 119 indexes the memory to the second byte location at the selected address. The second digit is then read into the comparator 18 from memory 14, the clock 16 pulsing as the counter 17 counts and passes the count to the comparator 18. Swtich 9 is thus pulsed according to the count of the second digit, as described above, until the count has reached the same number as that stored in the comparator 18. Digit counter 119 then indexes the memory to the next byte location, and the cycle repeats itself until an empty, zero count (or predetermined code signal) in the byte location is encountered. At this point zero detector 20 is actuated, opening switch 9, which removes load 8 from across the subscriber's line, and also recloses switch 10, providing a through current path from the switching office through to the subscriber's line.

It should be noted that the current sensing means can be a multifrequency receiver, the dial pulse detector and counter being output logic circuitry connected to the filters in the multifrequency receiver. In this case, the first digit translation means will translate between the logic output, and the binary coded address input required by memory 14.

Similarly, the normally open switch 9 could be a multifrequency signal generator, operated by a binary to serial converting second digit translating means, which will also include a responsive indexing means which indexes the byte locations at the selected address sequentially, in a timed or other responsive manner. The output of the zero detector would also open a switch in series with the tone generator as described earlier, and close series switch 10 in the line at the completion of dialing as in the described embodiment herein.

The invention will now be described in detail, with reference to the FIGS. 4, 5, 6, and 7, placed together in a manner shown in FIG. 3.

When a subscriber wishes to have a number automatically dialed, he will first lift his handset, which closes a current path through his station set. The loop current will flow from tip lead 50, through the collector-emitter circuit of the Darlington pair of transistors Q102 and Q103 which comprise semi-conductor switch A, (which switch is normally enabled on during idle and off-hook conditions from a high level signal appearing at the base of transistor Q102, to be described later), and to ring lead 50d of the telephone line leading to the station set. Current flow continues through the station set, and through the ring lead 51 through bridge rectifier 52, and to ring lead 51a leading to the central switching office. The bridge rectifier 52 is adapted to pass current flowing in any direction, and is made up of 4 diodes CR120, CR121, CR122, and CR123, as well as light-emitting diode 53, contained in an optical isolator which includes transistor 54.

Connected to and between the tip and ring leads 50 and 51a leading to the central office is another semi-conductor switch B made up of Q107 and Q108 connected in Darlington pair configuration, in series with diode CR111, and load resistor R128. Resistor R128 is of value which, when the switching means B is conducting, will keep the line relay at the central office operational, and typically will be 150 ohms. The load resistor can be connected in series with a light-emitting diode 76 of a second optical isolator, to be described later. The gate of switch B, which appears as the base of transistor Q108, is connected to a gating lead through diode CR112. At the present offhook condition, a low level signal is present thereat, and the gate is not operated to connect load resistor R128 across the line.

Current conduction will occur if a high level signal is applied through diode CR112 to the base of transistor Q108. This is obtained through the conduction of current from VDD, through resistor R127, and the emitter-collector circuit of a PNP transistor Q109, the collector of which is connected to the anode of the diode CR112. A low signal level at the base of transistor Q109 will actuate switch B connecting load R128 across the tip and ring leads 50 and 51a.

With light-emitting diode 53 lit due to passage of current therein, NPN transistor Q54 begins conduction, dropping the signal level at its collector to a low level. This signal is applied to a NAND gate U121A, is inverted and applied to NAND gate U121b, which inverts it a second time, and applies it to on-hook and an off-hook detectors 55 and 56. Therefore, an off-hook condition in the subscriber's loop will cause the collector of transistor 54 to drop to a low signal level, which will be the level of the signal applied at the output of gate U121b to the one and off hook detectors.

On-hook detector 55 is comprised of diode CR102 in series with resistor R139, which series arrangement is connected in parallel with large valued resistor R102 and between the output of NAND gate U121b and capacitor C102, which is also connected in series therewith to ground.

Diode CR102 is poled with its cathode to the output of gate U121b. accordingly, prior to the initiation of current flow in the subscriber's loop, the output of the gate U121b is at high level, which has allowed capacitor C102 to charge slowly through resistor R102. Once the output of gate U121b has dropped to a low level due to the initiation of an off-hook condition, capacitor C102 discharges rapidly through diode CR102, and a low level indication is provided at its output (the junction of capacitor C102 and diode CR102) which is applied to NOR gate U114a. Accordingly, the on-hook detector 55, which previously had a high level output indicating a subscriber on-hook condition is rapidly brought to a low signal level situation.

Off-hook detector 56 is comprised of diode CR103 connected in parallel with resistor R103, the arrangement being connected between the output terminal of gate U121b and capacitor C103, which is also connected to ground. Diode CR103 is poled with the anode to the output of gate U121b.

In the on-hook condition, capacitor C103 is charged up very rapidly due to the output of gate U121b being of high level, through diode CR103. In the off-hook condition, with the output of gate U121b low, capacitor C103 discharges through resistor R103, at a slight slower rate than the discharge of capacitor C102 in the on-hook detector. In the event of return to an on-hook condition, capacitor C102 will charge much more slowly through large valued resistor R102 than capacitor C103 will charge through diode CR103 (which is virtually a short circuit charging path). Accordingly capacitor C102 has a slow charge up, but a fast discharge to a low level, while capacitor C103 in the off-hook detector has a fast charge up but discharges to a low level with delay.

The off-hook condition will therefore cause a high level signal to appear at the output of NAND gate U121a. This signal is further fed to another NAND gate U119b, inverted to a low level signal, fed to NAND gate U118, inverted to a high signal level which is fed to NOR gate U109, inverted to a low signal level which is fed to NOR gate U114, inverted to high signal level which is fed to the base of transistor Q109. Because transistor Q109 is of PNP type, conduction therethrough is inhibited, it does not conduct, and switch B is not turned on.

The result is that as soon as a predialing offhook situation is obtained, load resistor R128 is not connected across the line (switch B being inhibited), and will not be connected until actual dialing occurs.

Returning now to the output signals of on and off-hook detectors 55 and 56, the output signal from the on-hook detector 55 is coupled through NOR gate U114a, inverted, and coupled through NAND gate U113a to an "inactive set" terminal 56 of Active flip flop U120a. Accordingly, when the signal at the junction of diode CR102 and capacitor C102 is high, due to an on-hook condition, a high signal will be provided at the inactive set input terminal 56 of the Active flip flop U120a. This will cause flip flop U120a to provide a clearing pulse at output terminal 59, which is used throughout to reset the dialer.

When the subscriber goes off-hook, the output of the on-hook detector drops to a low level, providing a low level signal at the inactive set input 56 of flip flop U120a. In the meantime, there has been a drop to a low level of the signal of the off-hook detector C103, delayed from that of the on-hook detector, this low level signal being inverted through inverting amplifier U117a, and applied to active set input 57 of Active flip flop U120a. A "station apparatus active" signal indication is thus produced by the Active flip flop U120a at output terminal 58.

In summary, in the event of return to an on-hook condition, the off-hook detector 55 will charge capacitor C103 very quickly, providing a low level signal at terminal 57 of active flip flop U120a while capacitor C102 of the on-hook detector 56 will charge very slowly through R102. This provides a high level signal at its output only after sufficient time is delayed to insure that the current break which caused the on-hook condition to be sensed is not the break of a dial pulse, a line hit, or the like. Once the time delay has occurred, a high level signal will appear at the inactive set input terminal 56 of Active flip flop U120a and cause a clearing pulse to appear on output terminal 59. As mentioned earlier, the clearing pulse is used in other parts of the automatic dialer for clearing of information and any stored signals, in the event of the subscriber hanging up at any time, including during outpulsing by the automatic dialer. This will be discussed in more detail later.

In the event the subscriber commences to dial a digit, for example the digit three, there will be three breaks in loop current occurring in the subscriber's line. These breaks will be evidenced by light-emitting diode 53 ceasing operation three times, and the input signal level of NAND gate U121a rising three times to high level.

The current breaks will cause the output of NAND gate U121a to pulse at low level, which low signal is applied through NAND gate U121c, where it is inverted to a high signal, and through NAND gate U121d, where it is inverted to low level. With the proper additional input signal to gate U121d, described earlier showing "station set active" from output terminal 58 of Active flip flop U120a, a low level pulsing signal is produced at the output of NAND gate U121d, which is applied to one input of NOR gate U114c. The pulses are inverted in gate U114c to high level, inverted again in inverting amplifier u107a to low level pulses, and are then timed.

Timing is effected by the circuit comprising C106 in series with R105 connected to a high level voltage VDD, the junction of the capacitor C106 and R105 being connected through inverting amplifier U107b to one terminal of capacitor C107. The other terminal of capacitor C107 is connected both to inverting amplifier U107c, and to resistor R106 which is also connected to a source of positive voltage VDD. Diodes CR126 and CR127 are connected in the inverse conduction direction across resistors R105 and R106 respectively. An inverting amplifier U107d is connected from the junction of amplifier U107b to input 61 of NAND gate U113a and the output of amplifier U107c is connected to a second input 62 of NAND gate U113a. This circuit forms a pulse length discriminator, which times the length of each of the pulses between tolerances set by the R-C time constants of the circuit, in order to distinguish pulses from other signal dropouts and noise.

Each pulse break, as well as being applied to the aforenoted circuits, is also applied from inverter U107a to clock input terminal 59 of flip flop U105a. During the period of the break, a low signal level appears at terminal 59, which will cause flip flop U105a to produce a pulse at is output 63 in the event of a low signal level appearing at its other input terminal 60 at the same time that the signal level at terminal 59 rises. The latter event will occur when the pulse breaks are within the time tolerances established by the pulse length discriminator, as follows.

In the event of the break pulse occurring simultaneously with a low signal at terminal 59 of flip flop U105a, a pair of timed pulses spaced by a predetermined period are triggered and applied to terminals 61 and 62 of NAND gate U113a. The output terminal of gate U113a produces a short clearing pulse, starting at the beginning of the break interval, and after a timed interval, a second pulse is produced. If the end of the break period of the pulse applied to terminal 59 of flip flop U105a occurs during the period between the clearing and the second pulse appearing at input terminal 60 of flip flop U105a, then an output signal at terminal 63 is created. Accordingly, the just described circuitry operates to time the break period and only transfer the pulse forward if it conforms to a true dialing pulse, and not to the time of a sporadic or random current break in the subscriber's loop.

The output dial pulse from terminal 63 of flip flop U105a is then applied to NAND gate U113c, the output of which is applied through inverting amplifier u117b to input terminal 64 of Number Counter U108.

Number Counter U108, available as a component from Radio Corporation of America as part number CD4024, translates the number of serial pulses received into BCD binary form. Accordingly, the BCD parallel binary output, appearing at terminals 65a, 65b, 65c, and 65d which corresponds to the number of input pulses, comprises an address location signal for the MOS memory, which corresponds to the address digit appearing in pulse form initially on the subscriber's line.

The address location signal is applied to the address input terminals 66a, 66b, 66c and 66d of an MOS Programmable Read Only Memory. This is available as a type 1702A memory from Microsystems International Limited of Ottawa, Canada. This memory may be divided into 16 zones, each individually addressed, each zone of which will contain sixteen groups of four bytes each. Each byte is comprised of four bits, which in binary notation, will describe adequately a number between 1 and 10 (the number 10 corresponding to the dialed zero). Accordingly, in each zone, a sixteen digit, number, each digit between 1 and 10 may be stored, the zone being accessed by a particular address location signal. Sixteen zones, individually addressed, will therefore store sixteen individual numbers to be dialed, for a total storage of 1024 bits. While the 1702a will store 2048 bits, the second half of the memory can be used for expansion.

Of course, the memory can be made to store a greater number of codes, and in another embodiment can store, say 96 numbers at 96 addresses, by adding additional memory devices and corresponding access and readout logic.

The preferred memory is electrically programmable and erasable by shining a strong ultraviolet light on its storage cells. Obviously this cannot normally be done by the subscriber, and control of the memory content is thus maintained by the telephone dialer or supplier or service company.

In the sixteen zone mode, the last zone can be left empty for provision of a dial through feature. Therefore the dialer can provide storage for fifteen addressable numbers to be dialed. In addition, the byte following the last digit to be dialed in each of the zones is left empty to provide an "end of dialing" indication, in order to designate completion of the dialed digit series. This allows the capacity of fifteen digits to be dialed, in each of 15 addressable locations. However, logic constraints may reduce the number of offered addressable locations to 10.

Connected also to the MOS memory at terminals 67a, 67b, 67c, and 67d is digit counter U104. The digit counter is available from Radio Corporation of America as part number CD4024, and is similar to Number Counter U108. Digit counter U104 sequentially counts input pulses at terminal 68, incrementing by one at its BCD binary coded output for each input pulse. A pulse will appear at terminal 68 each time coincidence occurs between the output of a single byte location from memory U201, with a clock pulse. As clocking is well known, it will not be described further. Suffice to say here, that a digit advance pulse will be provided to terminal 68 of digit counter U104 from a space counter U112, which in incremented by the decoding logic from memory each time a byte location is decoded.

The output from each byte location from memory U201 is presented in binary form from memory output terminals 267a, 267b, 267c and 267d to NOR gates U102a, U102b, U102c, and U102d. A third counter U101, operated as a binary to serial converter, also of type CD 4024, provides its binary output sequentially as a count to the second input terminal of gate U102a, U102b, U102c, and U102d from its output terminals 71a, 71b, 71c and 71d. Accordingly, as converter U101 increments, due to pulses appearing at its input terminal 69, a binary output count will appear at terminals 71a, 71b, 71c and 71d of converter U101, which is applied to the gates U102a, U102b, U102c and U102d in a sequentially counting manner.

The output terminals of gates U102c and U102d are connected to the respective input terminals of NOR gate U109a, and the output terminals of gates U102a and U102b are applied to the respective input terminals or NOR gate U109b. The output signals of gates U109a and U109d are applied to NAND gate U110a, which is inverted twice, once by passing through NAND gate U110b, and then through NOR gate U111a to input termial 70 of converter U101. The signal now applied to terminal 70 forms the output pulsing line, which eventually causes outpulsing of the stored number in memory. Accordingly, the output signal of NOR gate U111a forms both a counter incrementing pulse for converter U101, as well as an output pulsing signal for shunt load switch B, through intervening logic.

As the converter counts upward, it will finally count to the binary number held in the particular byte location of memory U201 which was presented to gates U102a U102d. At this point, matching occurs, and further out-pulsing via gate U111a will cease due to the lack of any further difference signals generated in gates U109a, U109b and U110a.

It should be noted, that NOR gate U111a must also have a signal applied from the clock, as well as one from another portion of the circuit, an "End" flip flop U116b. If all signals are present, out-pulsing is enabled.

The circuit described above forms a comparator, and causes out-pulsing as clocking progresses, the number of pulses counted up by converter U101 to a value which compares with the number stored in the appropriate byte location in memory U201.

Space Counter U112, which preferably is a Radio Corporation of America type CD4024 4024 counter provides an output pulse at terminal 72. This will allow the aforenoted pulsing to be enabled through NAND gate U110b and NOR gate U111a, only provided an input pulse appears at input terminal 73. An input pulse will be provided at that point provided NOR gate U111b is enabled by the existence of a clock pulse input, a pulse appearing from NAND gate U110c through NAND gate U110b, as well as an input pulse appearing on a conductor C, which feeds directly the operation component sequence which operates the gates of switch A and switch B described earlier. Accordingly, if the operation of switches A and B is inhibited for other reasons, such as an indication that the end of the number has been pulsed, line C will be without signal, and the space counter will be inhibited from operating. NOR gate U111c will have been inhibited, and therefore NAND gate U110b, through the lack of signal from the Space Counter U112 from NOR gate U111c which feeds NAND gate U110b.

An additional pair of NOR gates U103a and U103b has their respective input terminals connected to the binary output terminals 267a– 267d of memory U201, and has their output terminals respectively connected to two of the three input terminals of NAND gate U118. Gats U103a and U103b with U118 form a zero detector; if the content of all binary logical lines from memory U201 are zero, an output signal will appear at the output terminal of NAND gate U118, which will be inverted through amplifier U117c, and will be applied to an end flip flop U116b at its input terminal 74. It will be remembered that an empty memory location is reserved at the end of each number stored in memory U201. Since a zero (binary digit 10) in memory will not result in an empty byte location, the byte empty indication will therefore result in a signal applied to the End flip flop U116b. The End flip flop is a means in this embodiment for actuating switch A which will allow through access to the telephone line leading to the central office from the station set. Accordingly, at the present state, a signal will appear at output terminal 75 of flip flop U116b, which will operate NAND gate U119a, thus causing operation of switch A through means to be described below.

It should be noted that the "end of number" signification will both cause switch A to close and switch B to open, upon the application of a signal by End flip flop U116b to NAND gate U119a. However, this will be inhibited in the event of a signal appearing at the other input of NAND gate U119a, from a Sender flip flop U116a. On the other hand, the output of NAND gate U119a is also connected to the input of a NAND gate U119b as well as a NAND gate U119c. While NAND gate U119c is directly in the operation path of switch A, NAND gate U119b can also be operated from NAND gate U121a, which, it will be remembered, provides a signal when the light emitting diode of current sensor 53 senses current flow in the subscriber's line. Accordingly, it will be seen that NAND gate U119b will cause operation only of shunt switch S while current is flowing in the subscriber's loop due to an off-hook condition. During pulsing by the automatic dialer, NAND gate U119a will not be operated, causing the A switch to be opened, and disconnecting the station set from the subscriber's line leading to the switching office. Accordingly, any further dialing by the station set will not affect operation of the automatic dialer. After the dialer has outpulsed its destination number digit series, the A switch will be closed due to the signal now appearing at terminal 75 of the End flip flop U116b operating NAND gate U119a.

Earlier, it was noted that a pulsing signal appears at the output of NOR gate U111a, and is applied to input terminal 70 of the converter U101. This signal is applied to one input terminal of NOR gate U109d, which is in series with the line from NAND gate U119b, through NAND gate U118 and U109d. With a "close switch" B signal appearing from NAND gate U119b, the translation through NOR gate U109d will be inhibited by the existence of the pulsing signal appearing at its other input appearing from NOR gate U111a. Accordingly, while switch B is closed during the predialing off-hook condition, it will be pulsed open in time with the clock pulses generated on the aforenoted pulsing line. Indeed, the shunt switch S can be held open at will, with the application of signal to the other input of NAND gate U118, which provides a convenient method for allowing, or inhibiting, access of the station set to the telephone line leading to the switching office. The dial through inhibit terminal on NAND gate U118 can be actuated at a predetermined address location in memory U201.

We have not yet described the situation concerning the operation of switches A and B during the acutal dialing period by the station set. As noted earlier, the pulse length discriminator causes flip flop U105a to provide an output pulse at its terminal 63 when dialing commences. While each dialing pulse is passed to NAND gate U113c and to the Number Counter U108, it also is applied to one of the input terminals of Dial flip flop U120b. The Dial flip flop is set, and at each pulse, provides an output signal both to Number Counter U108 for synchronization and indexing, but also passes it to NAND gate U119d. This pulse is applied through gate U119d to NAND gate U118a as noted earlier, which causes closure of switch B. Accordingly each time a break pulse arrives from the station set, which, under ordinary circumstances would break current to the switching office, shunt switch S is closed, causing a rerouting of current and maintenance of a continuous current flow therefrom. This results in no pulse being transmitted through to the switching office. With the end of each break pulse, switch B is restored to an open condition.

The other output terminal of flip flop U120b applies a signal in the alternate time periods to gate U118b, which is activated thereby, and by the signal from the off-hook detector, as well as the clock. The output, after transposing in amplifier U117b, sets Sender flip flop U116a when all three inputs just mentioned of NAND gate U118b go high. In other words, no signal appears to set Sender flip flop U116a if capacitor C103 in the off-hook detector is low due to the presence of dialing. After dialing is complete, capacitor C103 charges with a time delay (the increase of charge occurring, after enough time delay to insure that no additional pulses are being received), and after the Dial flip flop has provided an indication that dialing has actually commenced. With the clock sink pulse applied to NAND gate U118b, Sender flip flop U116a provides a signal at its output conductor which leads to NAND gate U119a, to open switch A.

Accordingly, since the Sender flip flop U116a provides a signal at its other output prior to dialing, but after the off-hook condition, a signal will appear therefrom at NAND gate U119a, as well as in the circuit which turns the A switch on, completing the conduction path through to the station set. Therefore dial tone can be received from the switching office. When dialing commences of the memory address, the input from the off-hook detector will not provide a signal at NAND gate U118b. Therefore, for the entire dialing period while the station set dials the address digit, the A switch will be retained closed. As described earlier, the shunt switch B will close and open in harmony with the break periods during the pulsing of the dialed address digit.

During outpulsing from the automatic dialer the A switch is held open due to a signal appearing from End flip flop U116b, while shunt switch B is opened and closed as noted earlier from pulses emanating from NAND gate U111a. After the completion of outpulsing by the automatic dialer, the End flip flop will have been set from an empty byte address location in memory U201, allowing switch A to close, completing the circuit path from the station set to the switching office. In the meantime, shunt switch B will have been opened, removing the shunt current path across the two leads of the line, due to the operation of NAND gate U119a, operated from End flip flop U116b.

The operation of both the switches A and B are similar. In the operation of switch A, PNP transistor Q101 has its emitter connected through resistor R119 to a source of positive voltage VDD, and its collector through diode CR106, poled in the same direction with respect to VDD as the base-emitter diode of transistor Q101. Diode CR106 has its cathode connected to the base of NPN transistor Q102, connected with NPN transistor Q103 in a Darlington pair. Accordingly, a signal at the output terminal of NAND gate U119c will provide a 0 volts condition at the base of transistor Q101, which causes it to conduct. The collector will therefore be raised to a high signal condition level, causing diode CR106 to conduct, turning the Darlington pair in the A switch on, and providing a current path from the tip lead 50a of the station set, through the collector-emitter circuit of transistor Q103, to the tip lead 50 leading to the central office. The ring lead 5051a is fully conductive through the diode bridge 52.

In order to operate shunt switch S, a 0 volts signal condition appears at the output terminal of NOR gate U114, which is applied to the base of PNP transistor Q109. The emitter is connected through a resistor R127 to a source of positive voltage VDD, while its collector is connected through diode CR112 to the base of the Darlington pair of NPN transistors Q107 and Q108. Diode CR112 is poled in the same direction with respect to VDD as the base-emitter diode of transistor Q109.

A 0 volts condition at the base of transistor Q109 causes current to be conducted therethrough, and causes the anode of diode CR112 to become positive, and thus pole the base of transistor Q108 on. This causes current to be conducted through the emitter-collector circuit of transistor Q107 of the Darlington pair, allowing current to flow from the tip lead 50, through transistor Q107 and load resistor R128 to ring lead 51a.

It is preferable to include a diode CR111 in series with the collector circuit of the Darlington pair poled in the direction of positive current flow through the transistors, in order to protect the transistors from reverse currents which may occur on the line. This is a common type of signalling encountered during a long distance call. If reverse currents are encountered the current flow through the shunt resistor will automatically be cut off.

Use of a second optical isolator comprised of light-emitting diode 76 and transistor 77 is desirable. Light-emitting diode 76 is connected in the direction of positive current flow through load resistor R128 in order to indicate that current is flowing in the shunt circuit. Transistor 77 provides a low logic signal level at its collector, which is otherwise at high signal level due to its being connected through resistor R112 to a source of positive voltage VDD. The signal is applied to NOR gate U114c, along with the transposed dial pulse as described earlier, to the pulse length discriminator. Accordingly, no dial pulse signal will pass through NOR gate U114c unless light-emitting diode 76 is in fact lit up due to the existence of current flow through the load. This ensures that transients from the central office wil not be interpreted as dialed digits.

Turning now to NAND gate 115a, it may be seen that its two input terminals are connected respectively to the inhibit terminal of the Active flip flop U120a and to the output of NOR gate 114a. During the period in which the telephone switching office is ringing the station set, both inputs of NAND gate U115a will be at low signal level, resulting in a high signal level to appear at its output. Capacitor C112, which is coupled from ground through resistor R116 and diode CR114 to the output of NAND gate U115a, is charged up, allowing its junction with resistor R116 to go high. The high signal is coupled through NAND gate U115b and U115c to input terminal 78 of End flip flop U116b. This allows a signal at the output of End flip flop U116b which is an indication to NAND gate U119a that "all digits have been dialed" and that switch A should remain closed, keeping the tip lead continuous, switch B opened, and not shunting the line. Accordingly, an incoming call to the station set will be passed therethrough, the automatic dialer appearing to be transparent.

It should be noted that should the station set go onhook at any time, a clearing signal is generated at the output terminal 59 of Active flip flop U120a. This clearing signal resets all other flip flops to their inactive (on-hook) state, and removes all information counts, etc. from the dialer, except, of course, information stored in memory U201. This prepares the dialer for receipt of a new address digit from the station set.

The clearing signal is applied via conductor P to the second input of Dial flip flop U120a, to the second input of NAND gate U115a, and to the input of NAND gate U115d which is connected through resistor R118 and diode CR105 to capacitor C112. It is also applied to the second input of flip flop U116b, and to differentiating circuit comprised of capacitor C110 which is connected to inverting amplifier U117c, and to resistor R111 in parallel with diode CR128 to ground. The differentiated clearing signal, in pulse form, is applied to the second input of Sender U116a, the second input of NAND gate U115b, Digit Counter U104, NAND gate U109c leading to the input of counter U101, and to the second (clear) input of Space Counter U112.

It may be seen that the automatic dialer thus allows dial tone to be transmitted from the central office to the station set after the first off-hook condition has occurred, then shunts the subscriber's line during dialing of an address digit by the station set. During outpulsing of a destination number digit series stored at the memory, the circuit to the station set is open, and shunt across the subscriber's line repetitively provides breaks in to produce dial pulses, while the through connection from the switching office to the station set is maintained open. After pulsing by the dialer has been completed, the shunt is removed and the through connection to the switching office restored.

During ringing, the automatic dialer is made transparent, by setting an operational mode which internally appears as if dialing from the station set has been completed.

With an understanding of the aforenoted description, it may be seen that signals can be generated at the appropriate gates to cause the shunt switch B to be opened and the series switch A to be closed after a single digit has been dialed to reach an address location in memory which is empty, thus giving an internal indication that dialing has been completed, and that continuous access could be maintained between the station set and the switching office. By alternatively connecting the second input of NOR gate U114a to ground, instead of to the output of NOR gate U114b, and by connecting the input terminal of NAND gate U119b to the inhibit output terminal 79 of End flip flop U116b instead of to the output terminal of NAND gate U121a, the automatic dialer will be made transparent to further digits dialed from the station set, which may be transmitted and accepted by the central office. Accordingly, a telephone subscriber may dial, for instance, the digit 9 to gain access to the switching office, whereupon further digits may be dialed to switch a number through the network in the normal manner.

Other modifications and embodiments within the ambit of the claims will become obvious once the above description is understood by someone skilled in the art. For instance, a second station set may be connected to the automatic dialer, but allow automatic resetting of the automatic dialer and give priority to the first station set in the event the extension is being used, but the primary station set goes off-hook.

Numerous pulsing rates and inter-digital spacing may be provided. As described earlier, the input sensing circuits can be modified to receive and be responsive to a multifrequency address digit, and instead of outpulsing of a complete sequence of numbers, a multifrequency signal could be generated.

The automatic dialer need not specifically be used as between a station set and a central office; it could also be used between a PBX, which performs a line concentrating function, and a central office, and it can be located either at the central office, at the PBX end of the trunk leading thereto, at the station set itself, or anywhere on the line or trunk noted.

The embodiments of the invention in which an exclusive property or privilege is claimed are defined as follows:

1. An automatic dialer for connection to a pair of leads of a telephone line which may interconnect a station set with a central office comprising:
    a. a dummy load in series with a normally open switch, connected between the pair of wires of said telephone line,
    b. means for closing said switch, at least during periods of the interruption of current flow in said wires to the station set, during station set address digit dialing,
    c. a normally closed switch in series with one of the wires of the telephone line leading to the station set, between the dummy load and the station set,
    d. current sensing means connected in series with one of said leads for determining the existence of current flow in said leads,
    e. dial pulse detection means connected to the current sensor for measuring the period of any break in the current flow, to determine the existence of a dial pulse,
    f. pulse counting means connected to the dial pulse detection means or counting detected pulses which comprise an address digit,
    g. first digit translation means connected to the pulse counting means for converting the counted number of pulses into an address location signal,
    h. memory means connected to the first digit translation means for storing representations of destination numbers comprising a series of digits to be automatically dialed, at address locations in said memory means,
    i. a second digit translation means connected to the memory means, for receiving the representation of a predetermined destination number which is stored at the address location corresponding to the address digit, and for converting it to a serially coded destination number signal,
    j. means for applying a destination number digit series in dial pulse form to the telephone line which corresponds to the serially coded destination number signal, and k. means connected to said (d) means and said (i) means, including said (j) means for pulsing said normally open switch to generate the destination number digit series dial pulses, and for opening said normally closed switch during the entire destination number digit series dial pulsing period.

2. An automatic dialer as defined in claim 1, further including means for applying a predetermined residual current to said one of the wires leading to the station, of sufficient degree to be sensed by the current sensing means, and means, in the event of reduction of the predetermined residual current to zero due to external means, for responsively causing cessation of the operation of said second digit translation means, opening of said normally open switch, and closing of said normal closed switch.

3. An automatic dialer as defined in claim 1 in which the second digit translation means comprises:
   I. a clock, adapted to generate clock pulses at a predetermined rate,
   II. means for comparing the number of pulses generated by the clock with a digit of said predetermined destination number,
   III. means for applying a series of clock pulses to said (j) means until the number of pulses corresponds with the value of the digit of said predetermined destination number.

4. An automatic dialer as defined in claim 3, including discrete serially arranged byte locations for storage of the digits of the predetermined destination numbers in said memory, each byte location corresponding to a digit of said destination number; and means connected to said memory for indexing from one byte location to the next in sequence, upon completion of the translation of the digit stored in one byte location by the second digit translation means.

5. An automatic dialer as defined in claim 4 further including means connected to the memory for detecting a number completed indication stored in one of the byte locations of the said memory of a row, and in response to detection of the number completed indication of opening said normally open switch and closing said normally closed switch.

6. An automatic dialer as defined in claim 1 further including means for opening the normally open switch and closing the normally closed switch after reception by the memory of a predetermined transparency address, and for maintaining said switches in their respective open and closed positions, during the reception of subsequent dialing pulses, whereby said latter pulses may be applied on said line directly from the station set to the central office.

7. An automatic dialer, for connection to a telephone line leading from a central office to a station set, comprising:
   a. sensing means for sensing an address digit which may appear on said line,
   b. first translating means connected to said sensing means for translating said address digit into an address location signal, representing one of a number of address locations,
   c. memory means connected to said first translating means, for storing predetermined destination numbers, at predetermined address locations,
   d. second translating means for receiving from said memory a predetermined number stored at the address location corresponding to the address digit, and converting it to a destination number,
   e. means connected to the second translating means and to said telephone line for generating and transmitting on said line a destination number digit series, and
   f. means for connecting a dummy load to said line during reception of said address digit, and for cutting off all but a residual current flow to the station on said line during generation of the destination number digit series.

8. An automatic dialer as defined in claim 7, further including means for terminating the generation of said destination number digit series in the event of sensing, by the sensing means during the generation of said destination number digit series, of the reduction of said residual current to zero.

9. An automatic dialer for connection to a pair of wires of a telephone line, which may interconnect a station set with a central office, comprising:
   a. an optical isolator comprising means for current detection, connected in series with one of the pair of wires,
   b. a load connected in series with a normally open semiconductor switch between the pair of wires,
   c. a normally closed semiconductor switch connected in series with one of the wires, between the load and the station set,
   d. means for registering a flow of current in the subscribes line as an off-hook condition in the station set,
   e. means responsive to an indication of an offhook condition from the (d) means for registering and counting repetitive breaks in said flow of current as dial pulses, representative of a memory address, for closing the normally open switch and opening the normally closed switch at least during said breaks, and during outpulse operation of the dialer,
   f. a memory connected to the (e) means for storing representations of predetermined destination numbers at known address locations,
   g. comparator means connected to the memory for sequentially registering each digit of a selected destination number at a memory address,
   h. a counter connected to the comparator means, responsive to clock pulses, for sequentially counting pulses up to the number corresponding to the digit value stored in the comparator means,
   i. means for applying the counted clock pulses to the normally open switch in series with the load, for opening it in the with said pulses,
   j. means connected to the counter for indexing the memory to the succeeding digit location at said memory address once outpulsing of the preceding digit has been completed, and
   k. means connected to the memory for sensing the end of the sequence of said destination numbers, and for causing the closing of the normally closed switch and opening of the normally open switch.

10. An automatic dialer as defined in claim 9, further including means for sensing ringing current on the subscriber's line, and for responsively maintaining the normally closed switch closed, and the normally open switch open, during any succeeding off-hook current break condition by the station set, within a predetermined time after the end of a ringing pulse.

11. An automatic dialer as defined in claim 9, further including means within the (e) means for timing said dial pulses, and for counting those only falling within a predetermined time tolerance.

12. An automatic dialer as defined in claim 9, further including means for sensing an on-hook condition in the subscriber's line subsequent to the existence of an off-hook condition, for generating a clearing signal, and for applying it to all means within the dialer other than the memory which has any stored digit count or condition different from the normal on-hook idle condition for resetting them to their normally idle on-hook condition.

13. An automatic dialer as defined in claim 10, further including means within the (e) means for timing said dial pulses, and for counting those only falling within a predetermined time tolerance; means for sensing an on-hook condition in the subscriber's line subsequent to the existence of an off-hook condition, for responsively generating a clearing signal, and for applying the clearing signal to all means within the dialer other than the memory which has any stored digit count or condition different from the normal on-hook idle condition, thus resetting them to their normally idle on-hook condition.

14. An automatic dialer as defined in claim 9 further including means for opening the normally open switch and closing the normally closed switch after reception by the memory of a predetermined transparency address, and for maintaining said switches in their respective open and closed positions, during the reception of subsequent dialing pulses, whereby said latter pulses may be applied on said line directly from the station set to the central office.

* * * * *

UNITED STATES PATENT AND TRADEMARK OFFICE
CERTIFICATE OF CORRECTION

PATENT NO. : 3,993,877
DATED : November 23, 1976
INVENTOR(S) : A. M. Sendyk et al.

It is certified that error appears in the above-identified patent and that said Letters Patent are hereby corrected as shown below:

Col. 9, line 39, second "4024" s/b eliminated

Col. 15, line 15, "normal" s/b --normally--

Col. 16, line 28, "subscribes" s/b --subscribers--

Col. 16, line 49, delete "the" and insert --time-- therefor

Signed and Sealed this

Sixth Day of September 1977

[SEAL]

Attest:

RUTH C. MASON
Attesting Officer

LUTRELLE F. PARKER
Acting Commissioner of Patents and Trademarks